(12) United States Patent
Gershoni et al.

(10) Patent No.: US 10,445,496 B2
(45) Date of Patent: Oct. 15, 2019

(54) PRODUCT RISK PROFILE

(71) Applicant: HEWLETT PACKARD ENTERPRISE DEVELOPMENT LP, Houston, TX (US)

(72) Inventors: Tomer Gershoni, Yehud (IL); Yaniv Toledano, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 144 days.

(21) Appl. No.: 15/326,169

(22) PCT Filed: Jul. 30, 2014

(86) PCT No.: PCT/US2014/048829
§ 371 (c)(1),
(2) Date: Jan. 13, 2017

(87) PCT Pub. No.: WO2016/018286
PCT Pub. Date: Feb. 4, 2016

(65) Prior Publication Data
US 2017/0200006 A1    Jul. 13, 2017

(51) Int. Cl.
G06F 21/00 (2013.01)
G06F 21/55 (2013.01)
G06F 21/50 (2013.01)
G06F 21/10 (2013.01)
G06Q 10/06 (2012.01)
G06Q 50/10 (2012.01)

(52) U.S. Cl.
CPC ........... *G06F 21/552* (2013.01); *G06F 21/10* (2013.01); *G06F 21/50* (2013.01); *G06Q 10/06* (2013.01); *G06Q 10/0635* (2013.01); *G06Q 50/10* (2013.01)

(58) Field of Classification Search
None
See application file for complete search history.

(56) References Cited

U.S. PATENT DOCUMENTS 7,308,388 B2    12/2007    Bevetina et al.
8,533,843 B2     9/2013    Levi
(Continued)

FOREIGN PATENT DOCUMENTS

KR    20120134725 A    12/2012

OTHER PUBLICATIONS

International Search Report & Written Opinion received in PCT Application No. PCT/US2014/048829, dated Mar. 31, 2015, 13 pages.
(Continued)

*Primary Examiner* — Andrew J Steinle

(57) ABSTRACT

In one implementation, a system calculating a product risk profile includes a criticality score engine to calculate a criticality score via an aggregation of values assigned to a plurality of descriptions of a component of a product criticality. In addition, the system includes a vulnerability score engine to calculate a vulnerability score via an aggregation of a quantity of security risks found during a security assessment for the product. In addition, the system includes a product risk profile engine to calculate a product risk profile for the product via a multiplication of the criticality score and the vulnerability score.

18 Claims, 4 Drawing Sheets

(56) References Cited

U.S. PATENT DOCUMENTS

| | | |
|---|---|---|
| 8,539,586 B2 | 9/2013 | Stephenson |
| 8,819,442 B1* | 8/2014 | Gehrig ................ H04L 63/1433 |
| | | 713/180 |
| 2004/0191743 A1* | 9/2004 | Chiu ........................ G09B 7/00 |
| | | 434/322 |
| 2009/0024663 A1* | 1/2009 | McGovern ............ G06F 21/577 |
| 2010/0095381 A1 | 4/2010 | Levi |
| 2010/0153156 A1 | 6/2010 | Guinta et al. |
| 2013/0191919 A1 | 7/2013 | Basavapatna et al. |
| 2013/0247205 A1* | 9/2013 | Schrecker ............. G06F 21/577 |
| | | 726/25 |
| 2014/0137257 A1 | 5/2014 | Martinez et al. |

OTHER PUBLICATIONS

Musselman, J., "McAfee Vulnerability Manager," (Research Paper), Data Sheet, Jan. 16, 2009, 3 pages, available at http://www.reportstar.net/Userfiles/Docs/Products/mcafee_vulnerability_manager[1].pdf.

* cited by examiner

PRODUCT RISK PROFILE

BACKGROUND

A risk can be defined by a product of a likelihood and impact of an event. A risk management tool can utilize various inputs to determine a risk associated with a particular endeavor. A risk management tool can be useful in an information technology (IT) environment. Identifying a risk in an IT environment can contribute to management and assessment of IT security risks.

DETAILED DESCRIPTION

Figure 1:
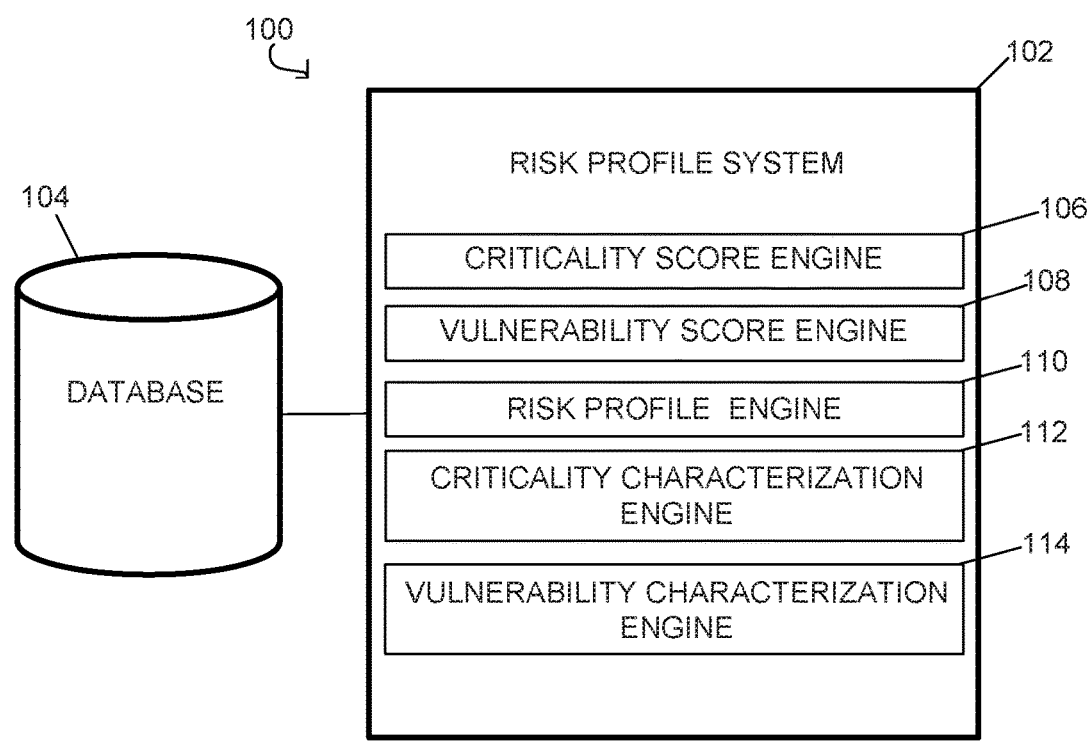
FIG. 1 illustrates a diagram of an example of a system for calculating a product risk profile according to the present disclosure.

A risk management tool can utilize inputs related to a product to calculate a risk associated with a system. The risk associated with a system can include a variety of risks. The variety of risks can include financial risks, security risks, missed opportunity risks, etc.

A risk management tool can be dimensionally limited by a focus on specific aspects of risk as they relate to the system. For example, a risk management tool receives inputs related to a specific component of a specific type of risk associated with the system. The type of risk can be a security risk associated with the system. The specific components of the security risk can include negative impacts within the system associated with exploitation of that security risk. The security risk can be an actual risk (e.g., potential exploit) found in the system.

The focused nature of a risk management tool causes its output to have a particular application. For example, a risk management tool assessing a security risk within a system based on an actual risk found in the system will produce an output focused on that particular found risk. The output can be based on limited metrics distinct to the found risk. The output is, therefore, useful only in assessment of the particular risk by those with a comprehension of the metrics, the application of those metrics, and the output format of the risk management tool.

Risk management tools can be used in an information technology (IT) environment to assess security risks. Risk management tools can score a computer system security vulnerability based on a series of metrics determined by expert assessment of found vulnerabilities. The score can reflect the severity of the vulnerability. The metrics upon which the score is based can include base metrics for qualities intrinsic to a vulnerability, temporal metrics for characteristics that evolve over the lifetime of the vulnerability, and environmental metrics for the vulnerability that depend on a particular implementation or environment.

In contrast, the embodiments of the present disclosure describe a modular system, method, and computer readable medium for calculating a comprehensive risk profile of a product during its development.

As used herein, a product can include a software application being developed. Developing a software application can include a variety of tasks or activities that take place during planning, implementation, testing, documenting, releasing, deploying, and maintaining the application. At any point during development the product can be assessed. The product can also be assessed by a software application analyzing utility that collects inputs regarding specific characteristics of risk related to the software application during development (e.g., assessment of the product). The input may be received from a user device, an application development team, application architect, and/or application manager. Alternatively, the input may be generated by the software application analyzing utility itself during an automated assessment of the product. The software application analyzing utility can be a comprehensive risk profile calculator. As used herein, a comprehensive risk profile calculator can include an application that receives and/or generates inputs related to business characteristics and security vulnerabilities of the software application being analyzed. The comprehensive risk profile calculator can assess a security risk and an asset value impact associated with exploitation of a security risk associated with the software application being analyzed.

Figure 2:
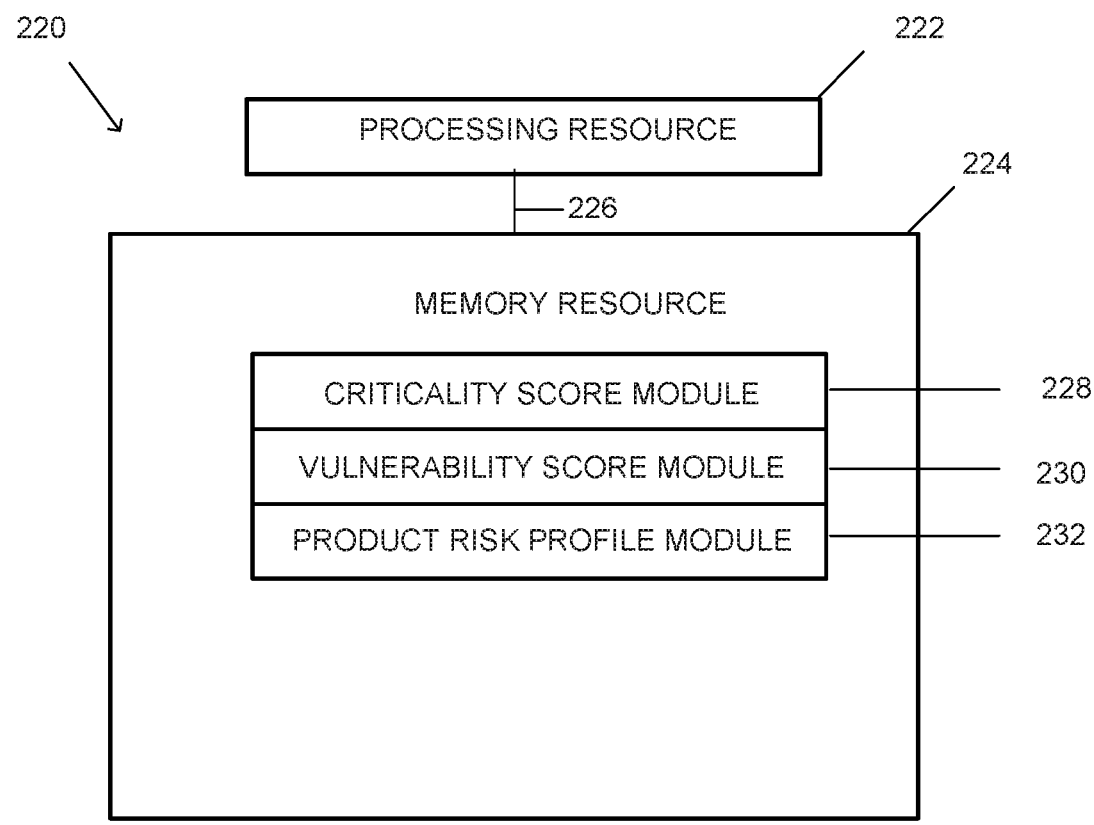
FIG. 2 illustrates a diagram of an example computing device according to the present disclosure.

FIGS. 1 and 2 illustrate examples of system 100 and computing device 220 according to the present disclosure. FIG. 1 illustrates a diagram of an example of a system 100 for calculating a product risk profile according to the present disclosure. The system 100 can include a database 104, a risk profile system 102, and/or a number of engines (e.g., criticality score engine 106, vulnerability score engine 108, risk profile engine 110, criticality characterization engine 112, vulnerability characterization engine 114). The risk profile system 102 can be in communication with the database 104 via a communication link, and can include the number of engines (e.g., criticality score engine 106, vulnerability score engine 108, risk profile engine 110, criticality characterization engine 112, vulnerability characterization engine 114). The risk profile system 102 can include additional or fewer engines that are illustrated to perform the various functions as will be described in further detail.

The number of engines (e.g., criticality score engine 106, vulnerability score engine 108, risk profile engine 110, criticality characterization engine 112, vulnerability characterization engine 114) can include a combination of hardware and programming, but at least hardware, that is configured to perform functions described herein (e.g., a criticality score engine to calculate a criticality score via an aggregation of values assigned to a plurality of descriptions of a component of a product criticality, calculate a vulnerability score via an aggregation of a quantity of security risks found during a security assessment for the product, a product risk profile engine to calculate a product risk profile for the product via a multiplication of the criticality score and the vulnerability score, etc.). The programming can include program instructions (e.g., software, firmware, etc.) stored in a memory resource (e.g., computer readable medium, machine readable medium, eta) as well as hard-wired program (e.g., logic).

The criticality score engine 106 can include hardware and/or a combination of hardware and programming, but at least hardware, to calculate a criticality score via an aggregation of values assigned to a plurality of descriptions of a component of a product criticality. As used herein, a product criticality includes an assessment framework by which to assess overall business characteristics of a product and/or a business impact that could result from an exploitation of a security vulnerability of the product. Product criticality can include the importance of the product as an asset from a business and/or a security perspective.

As used herein, a criticality score includes a value associated with the criticality of a product. The criticality score of the product can correlate to a business value of the product. The criticality score can be a calculated value that is calculated from values assigned to a plurality of descriptions of components of product criticality. For example, the plurality of descriptions can include sets of descriptions. Each set of descriptions can comprise descriptions that cumulatively characterize a component of product criticality. That is, each description of the set of descriptions can provide a characterization of a portion of a range, scale, and/or continuum of possible classifications and/or quantifications of a component of product criticality. Cumulatively, all the sets of descriptions within the plurality of descriptions can provide a characterization of all the components of product criticality.

A selection of a description can be received as an input. The selection of the description can be generated by assessment of the product. The assessment can be performed by the comprehensive risk profile calculator and/or by a user. Accordingly, the selection of a description can be performed by the comprehensive risk profile calculator and/or by a user device. The selection of a description can include selection of a description that provides a characterization of a portion of a range, scale, and/or continuum of possible classifications and/or quantifications that corresponds to the characteristics of the product. That is, a description that most closely describes characteristics of the product can be selected. The selection of a description can indicate a characteristic of the product to the risk profile system 102. A description from each one of the set of descriptions characterizing a component of product criticality can be selected. Therefore, characteristics of the product corresponding to each of the components of product criticality can be indicated through the selections.

As described above, each of the descriptions can have a value assigned to it. Accordingly, each of the selected descriptions can have a value assigned to it. The criticality score can be calculated from the values assigned to the selected descriptions of components of product criticality. For example, the criticality score can be calculated from an aggregation of the values assigned to the plurality of selected descriptions of components of product criticality. In another example, the criticality score can be calculated from an aggregation of the values assigned to the plurality of selected descriptions of components of product criticality, wherein each of the values in the aggregation are weighted.

The criticality characterization engine 112 can include hardware and/or a combination of hardware and programming, but at least hardware, to assign a criticality characterization to the product based on a relationship of the criticality score to a predetermined threshold. As used herein, a criticality characterization includes a description of the criticality score. The description can be a classification and/or a quantification of the criticality score. The criticality characterization can include a description of a tier and/or level to which the criticality score corresponds. The criticality characterization can be a prioritization of the importance of the product as an asset from a business and/or a security perspective. The criticality characterization can be based on where a product criticality score falls within a plurality of predetermined and modifiable product criticality score thresholds. For example, the criticality characterization can be high, medium, or low. A high criticality characterization can include a product criticality score that is greater than or equal to a score threshold of 2. A medium criticality characterization can include a product criticality score that is greater than or equal to a score threshold of 1.5 and/or less than a score threshold of 2. A low criticality characterization can include a product criticality score that is less than a score threshold of 1.5. The specific score thresholds can be modified by a user device to suit the maturing strategic definitions and tolerances of a business associated with (e.g., a product developer, a product provider, a cloud service provider, a software application tenant, a software application user, etc.) the product. For example, as a business and/or software product matures the tolerance for risk and/or relative value of the asset may change. In these instances, the thresholds can be modified to reflect the changing tolerances and values.

The vulnerability score engine 108 can include hardware and/or a combination of hardware and programming, but at least hardware, to calculate a vulnerability score via an aggregation of a quantity of security risks found during a security assessment for the product. As used herein, a vulnerability score can include a score characterizing a security risk of an assessed product. For example, the vulnerability score can characterize and/or correlate to a probability of an exploitation of the product and an impact of that exploitation. The product vulnerability score can be calculated based on a number of unique security risks found during an assessment of a product. For example, the product vulnerability score can be calculated based on an aggregation of a quantity of specific risk characterizations assigned to the product. The risk characterizations can be qualitative descriptions applied to a total risk score for a security vulnerability of the product.

As used herein, a security assessment of a product (e.g., a software application) includes analyzing a product during its development and collecting inputs regarding a security vulnerability of the product. The input may be identified and/or detected by the utility itself and/or by inputs received from an application development team, application architect and/or application manager. The utility can be a risk assessment calculator. As used herein, a risk assessment calculator can include an application that receives inputs related to security vulnerabilities of the software application being analyzed. The risk assessment calculator can assess a risk associated with the software application (e.g., exploitation of a security risk associated with the software application) being analyzed based on known standards optimized to the software application being analyzed. Any type of risk assessment calculator can be utilized in a security assessment of a product including the embodiments described with respect to FIG. 3.

The risk assessment calculator can generate a total risk score. As used herein, a total risk score can include a score associated with a security assessment of software application design risks (e.g., potential security vulnerability exploits) originating in the early stages of software application development and/or in actual "hands on" checks of a product. The total risk score for each specific design risk of the product can then be characterized (e.g., as a risk characterization). The risk characterization can include a qualitative description selected from a scale of qualitative descriptions comprising Low, Medium, High, and/or Critical wherein predetermined total risk score thresholds are associated with each characterization. The particular qualitative description assigned to the total risk score can be based on where the total risk score falls within a predetermined scale defined by the predetermined total risk score thresholds that are associated with each characterization. A quantity of each of the risk characterizations (e.g., Low, Medium, High, and/or Critical) can result from the security assessment of the product. The vulnerability score can be calculated by an aggregation of the security risks (e.g., quantities of each of the risk characterizations assigned to each total risk score resulting from a security assessment of the product). For example, the quantities of each of the risk characterizations for a product can be weighted and aggregated to produce the vulnerability score for the product. The quantities of each of the risk characterizations can be weighted such that, for example, the aggregation will produce a vulnerability score between 1-100.

The vulnerability characterization engine 114 can include hardware and/or a combination of hardware and programming, but at least hardware, to assign a criticality characterization to the product based on a relationship of the criticality score to a predetermined threshold. As used herein, a vulnerability characterization includes a description of the vulnerability score. The description can be a classification and/or a quantification of the vulnerability score. The vulnerability characterization can include a description of a tier and/or level to which the vulnerability score corresponds. The vulnerability score can be a prioritization of the security vulnerability of the product being assessed. The vulnerability characterization can be based on where a vulnerability score for the product falls within a plurality of predetermined and modifiable product criticality score thresholds. For example, the security vulnerability characterization can be High, Medium, and/or Low based on where the vulnerability score falls within a predetermined scale (e.g., 1-100) defined by the predetermined vulnerability score thresholds that are associated with each characterization. The specific score thresholds can be modified by a user device to suit the maturing strategic definitions and vulnerability tolerances of a business associated with (e.g., a product developer, a product provider, a cloud service provider, a software application tenant, a software application user, etc.) the product. For example, as a business and/or software product matures the tolerance for risk associated of the asset may change. In these instances, the thresholds can be modified to reflect the changing tolerances.

The product risk profile engine 110 can include hardware and/or a combination of hardware and programming, but at least hardware, to calculate a product risk profile for the product via a multiplication of the criticality score and the vulnerability score. As used herein, a product risk profile includes a quantification and/or characterization of a security risk and/or business/security value of an assessed product based on the two component scores: the criticality score and the vulnerability score for the product. For example, the product risk profile can be a product of the criticality score multiplied by the vulnerability score.

The product risk profile engine 110 can also include hardware and/or a combination of hardware and programming, but at least hardware, to compare the product risk profile of a software product being assessed with a product risk profile of another software product. For example, the product risk profile of the software product being assessed can be compared to risk profile of a benchmark software product. As used herein, a benchmark software product includes a software product that serves as a standard (e.g., industry-wide standard, business-wide standard, individual standard, etc.) by which software applications are judged. The comparison can include flagging the risk profile of the software product being assessed where it deviates from the risk profile of the benchmark product. The comparison can also include generating projections and/or recommended risk mitigation measures for the software product being assessed based on the historical risk mitigation measures and or application qualities associated with the benchmark software product.

FIG. 2 illustrates a diagram of an example computing device 220 according to the present disclosure. The computing device 220 can utilize software, hardware, firmware, and/or logic to perform functions described herein.

The computing device 220 can be any combination of hardware and program instructions configured to share information. The hardware, for example, can include a processing resource 222 and/or a memory resource 224 (e.g., computer-readable medium (CRM), machine readable medium (MRM), database, etc.). A processing resource 222, as used herein, can include any number of processors capable of executing instructions stored by a memory resource 224. Processing resource 222 may be implemented in a single device or distributed across multiple devices. The program instructions (e.g., computer readable instructions (CRI)) can include instructions stored on the memory resource 224 and executable by the processing resource 222 to implement a desired function (e.g., calculate a criticality score for the product via a weighted aggregation of values assigned to a plurality of descriptions of a component of a product criticality of a software product undergoing development, calculate a vulnerability score via a weighted aggregation of a quantity of security risks found during a security assessment of the software product undergoing development, calculate a product risk profile for the product via a multiplication of the criticality score and the vulnerability score, compare the product risk profile of the software product with a product risk profile of another software product, etc.).

The memory resource 224 can be in communication with a processing resource 222. A memory resource 224, as used herein, can include any number of memory components capable of storing instructions that can be executed by processing resource 222. Such memory resource 224 can be a non-transitory CRM or MRM. Memory resource 224 may be integrated in a single device or distributed across multiple devices. Further, memory resource 224 may be fully or partially integrated in the same device as processing resource 222 or it may be separate but accessible to that device and processing resource 222. Thus, it is noted that the computing device 220 may be implemented on a participant device, on a server device, on a collection of server devices, and/or a combination of the participant device and the server device.

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., criticality score module 228, vulnerability score module 230, product risk profile module 232) can include CRI that when executed by the processing resource 222 can perform functions. The number of modules (e.g., criticality score module 228, vulnerability score module 230, product risk profile module 232) can be sub-modules of other modules. For example, the criticality score module 228 and the vulnerability score module 230 can be sub-modules and/or contained within the same computing device. In another example, the number of modules (e.g., criticality score module 228, vulnerability score module 230, product risk profile module 232) can comprise individual modules at separate and distinct locations (e.g., CRM, etc.).

Each of the number of modules (e.g., criticality score module 228, vulnerability score module 230, product risk profile module 232) can include instructions that when executed by the processing resource 222 can function as a corresponding engine as described herein. For example, the criticality level score module 228 can include instructions that when executed by the processing resource 222 can function as the criticality score engine 106. In another example, the vulnerability score module 230 can include instructions that when executed by the processing resource 222 can function as the vulnerability score engine 108. In another example, the product risk profile module 232 can include instructions that when executed by the processing resource 222 can function as the risk profile engine 110.

Figure 3:
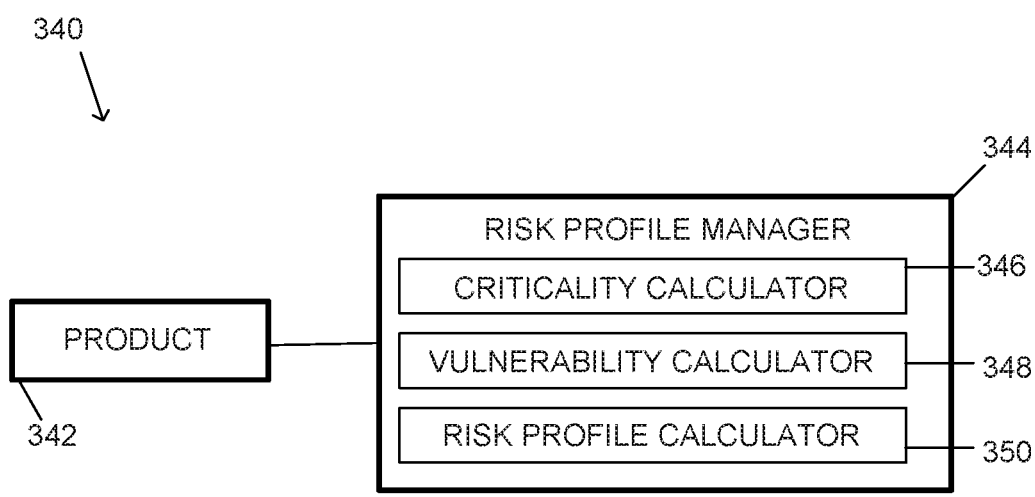
FIG. 3 illustrates an environment for calculating a product risk profile according to the present disclosure.

FIG. 3 illustrates an environment 340 for calculating a comprehensive risk profile of a product 342 according to the present disclosure. The environment 340 includes a product 342, a risk profile manager 344, criticality calculator 346, vulnerability calculator 348, and a risk profile calculator 350. The product 342 includes a product offered by a business. For example, the product can include a software application (application programs deployed on a customer premise, software as a service, a cloud managed service provided application program, a mobile application, any other computer readable instructions executable by a processing resource to implement a desired function, etc.) that is undergoing development by the business. The business can include a cloud provider, a software developer, an organization associated with the software application, etc.

The environment 340 can also include a development environment (not illustrated). The development environment can include a release manager that manages the process of developing a product 342. The development environment can include a number of sub-environments and/or tiers. For example, the development environment can include a planning environment (e.g., an environment for planning a software application and/or its projected functionalities), local environment (e.g., a desktop and/or workstation of a developer), a development environment (e.g., a sandbox, a testing environment that allows for experimentation with code changes, test server, etc.), an integration environment (e.g., an environment for continuous integration to a build target, etc.), a test environment (e.g., an environment for performance testing and/or quality assurance testing), user acceptance testing environment (e.g., beta testing, etc.), a pre-production environment (e.g., an environment mirroring a production environment), and/or a production environment (e.g., serving end-users, etc.). The development environment can include a number of software developers and/or developers' devices. The development environment can include the product 342.

The environment 340 can include a risk profile manager 344. As used herein a risk profile manger 344 includes a product analyzing utility that collects inputs regarding business characteristics and security vulnerabilities related to the product 342 during development (e.g., assessment of the product). The input may be received from a user device, an application development team, application architect, and/or application manager. Alternatively, the input may be generated by the product analyzing utility itself during an automated assessment of the product 342. The product analyzing utility can be a comprehensive risk profile calculator. As used herein, a comprehensive risk profile calculator can include an application that receives and/or generates inputs related to business characteristics and security vulnerabilities of the product 342 being analyzed. The comprehensive risk profile calculator can assess a security risk and an asset value impact associated with exploitation of a security risk associated with the product 342 being analyzed.

The environment 340 can include a criticality calculator 346. The criticality calculator 346 can calculate a criticality score for the product 342. The criticality score can be calculated by aggregating values assigned to a plurality of descriptions of components of a product criticality. For example, the plurality of descriptions can include sets of descriptions. Each set of descriptions can comprise descriptions that cumulatively characterize a component of product criticality. That is, each description of the set of descriptions can provide a characterization of a portion of a range, scale, and/or continuum of possible classifications and/or quantifications of a component of product criticality. Cumulatively, all the sets of descriptions within the plurality of descriptions can provide a characterization of all the components of product criticality.

An example of a component of product criticality can include an amount of revenue associated with the product 342. An amount of revenue associated with a product can include an amount of a sales and/or licensing revenue generated by the sale and/or provision of the product 342. The amount of revenue can be an amount of revenue generated over a period of time (e.g., annual amount, quarter amount, monthly amount, etc.). The amount of revenue associated with the product 342 can represent a value of business damages caused by a potential breach or loss of trust associated with the product 342.

The set of descriptions that cumulatively characterize an amount of revenue associated with the product 342 can each include a description of a portion of coverage of a range, scale, and/or continuum of possible classifications of revenue. For example, the set of descriptions can include a description of a high annual revenue, a description of a medium annual revenue, and a description of a low annual revenue. The amounts associated with each description can be exact dollar amounts and/or dollar ranges. The amounts can be modifiable by a user device and/or a business associated with the product 342. In one example, the set of descriptions can include a description of a high revenue characterized by annual revenues of greater than or equal to two hundred million dollars for the product 342, the set of descriptions can also include a description of a medium revenue characterized by annual revenues of less than two hundred million dollars but greater than or equal to one hundred million dollars for the product 342, and the set of descriptions can also include a description of a low revenue characterized by annual revenues of less than one hundred million dollars for the product 342.

Each description of the set of the descriptions can be assigned a value (e.g., scored). For example, the descriptions can be associated with a score that can be a number within a sequence of numbers comprising a scale. The scores can include, for example, the numbers 1, 2, and 3. For example, the description describing the amount of revenue as low can be assigned a score of 1. The description describing the amount of revenue as medium can be assigned a score of 2. The description describing the amount of revenue as high can be assigned a score of 3.

Another example of a component of product criticality can include a business strategy associated with the product

342. A business strategy associated with the product 342 can include a business strategy type assigned to the product 342 by the business associated with the product (e.g., the management of the organization that sells, delivers, and/or provides access to the product 342). The business strategy can include a level of importance that the business has assigned to the product. For example, the business strategy can include a high priority of go to market. The business strategy can include internal and/or market-standard designations of product importance that a business associates with the product 342.

The set of descriptions that cumulatively characterize a business strategy associated with the product 342 can each include a description of a portion of coverage of a range, scale, and/or continuum of possible classifications of business strategy. For example, the set of descriptions can include a description of a high business strategy, a description of a medium business strategy, and a description of a low business strategy. The descriptions can be modifiable by a user device and/or a business associated with the product 342.

Each description of the set of the descriptions can be assigned a value (e.g., scored). For example, the descriptions can be associated with a score that can be a number within a sequence of numbers comprising a scale. The scores can include, for example, the numbers 1, 2, and 3. For example, the description describing the business strategy as low importance can be assigned a score of 1. The description describing the business strategy as medium importance can be assigned a score of 2. The description describing the business strategy as high importance can be assigned a score of 3.

Another example of a component of product criticality can include a type of information associated with the product 342. A type of information associated with the product 342 can include a type of data processed and/or stored by the product 342. The type of information processed and/or stored by the product 342 can have a direct impact on a potential breach severity.

The set of descriptions that cumulatively characterize a type of information associated with the product 342 can each include a description of a portion of coverage of a range, scale, and/or continuum of possible classifications of processed and/or stored information associated with the product 342. For example, the set of descriptions can include a description of highly sensitive information, a description of business sensitive information, and a description of low sensitivity data. The types of information can be modifiable by a user device and/or a business associated with the product 342. In one example, the set of descriptions can include a description of a highly sensitive data characterized by personally identifiable information (e.g., information that can be used on its own or with other information to identify, contact, or locate a single person, or to identify an individual in context) including financial information, personal healthcare information, sensitive business transactions, social security number, etc. The set of descriptions can also include a description of business sensitive information characterized by confidential business information whose disclosure may harm the business (e.g., trade secrets, financials, sales, marketing plans, new product plans, patent application notes, customer information, supplier information, etc.). The set of descriptions can also include a description of low sensitivity data characterized by information that could not directly negatively affect a business or individual (e.g., publically available information, anonymous information, etc.)

Each description of the set of the descriptions can be assigned a value (e.g., scored). For example, the descriptions can be associated with a score that can be a number within a sequence of numbers comprising a scale. The scores can include, for example, the numbers 1, 2, and 3. For example, the description describing the type of information associated with the product 342 as low sensitivity information can be assigned a score of 1. The description describing the type of information associated with the product 342 as business sensitive information can be assigned a score of 2. The description describing the type of information associated with the product 342 as highly sensitive information can be assigned a score of 3.

Another example of a component of product criticality can include a deployment model associated with the product 342. A deployment model associated with the product 342 can include the methods for deploying the product 342 defining the exposed surfaces of the product 342. The deployment method can include the surfaces that comprise attack vectors (e.g., the surfaces of the product 342 that can be used to infiltrate, etc.) for the product 342. For example, if a product 342 is installed locally at a business, the potential risk of attacks is lower than a product 342 that is installed in a software as a service cloud environment since the product installed in a software as a service environment has a higher exposure (e.g., more exposed accessible surfaces) to potential threats.

The set of descriptions that cumulatively characterize a deployment model associated with the product 342 can each include a description of a portion of coverage of a range, scale, and/or continuum of possible classifications of a deployment model associated with the product 342. For example, the set of descriptions can include a description of an external deployment model, a description of a mixed deployment model, and an internal deployment model. The deployment model descriptions can be modifiable by a user device and/or a business associated with the product 342. In one example, the set of descriptions can include a description of an external deployment model characterized by an internet facing surface and/or surfaces highly intrusive to the internal network product 342 (e.g., software as a service product 342, external product 342, a software as a service product with an on premise component, eta). The set of descriptions can also include a description of a mixed deployment environment characterized by an on premise product 342 with a World Wide Web presence potential (e.g., a product 342 with a possibility to be deployed either with a World Wide Web facing surface or a non-World Wide Web facing surface, etc.). The set of descriptions can also include a description of an internal deployment model characterized by a product 342 that is on premise only with no external exposure.

Each description of the set of the descriptions can be assigned a value (e.g., scored). For example, the descriptions can be associated with a score that can be a number within a sequence of numbers comprising a scale. The scores can include, for example, the numbers 1, 2, and 3. For example, the description describing the deployment model associated with the product 342 as an internal deployment model can be assigned a score of 1. The description describing the deployment model associated with the product 342 as a mixed deployment model can be assigned a score of 2. The description describing the deployment model associated with the product 342 as an external deployment model can be assigned a score of 3.

Another example of a component of product criticality can include a breach history associated with the product 342.

A breach history associated with the product 342 can include an amount of breaches (e.g., exploitations of security vulnerabilities, instances of hacking, instances of data loss, instances of data damage, unauthorized access, notifications of exploitations of security vulnerabilities, etc.) of the product 342. The amount of breaches can be an amount over a particular period of time. A breach history can also include an existing reputation of the product 342. For example, a quantitative or qualitative characterization of the reputation of a product 342 (e.g., good reputation with no/minimal breaches, medium reputation with some breaches resulting in some reputation damage, a poor reputation with several breaches resulting in a poor reputation, etc.). A breach history can also include a probability of future exploitations of a security vulnerability of the product 342 based on a frequency and/or amount of historical exploitations of a security vulnerability. A breach history can highlight where security resources should be allocated in order to preserver reputations, repair reputations, and/or secure a product 342 against further breaches.

The set of descriptions that cumulatively characterize a breach history associated with the product 342 can each include a description of a portion of coverage of a range, scale, and/or continuum of possible classifications of a breach history associated with the product 342. For example, the set of descriptions can describe breach history in terms of breach thresholds. The breach thresholds can be modifiable by a user device and/or a business associated with the product 342. In one example, the set of descriptions can include a description of a low breach history characterized by no breaches and/or an amount of breaches less than a predetermined threshold. The set of descriptions can also include a description of a medium breach history characterized by one breach and/or an amount of breaches between two predetermined thresholds. The set of descriptions can also include a description of a high breach history characterized by more than one breach and/or an amount of breaches greater than a predetermined threshold.

Each description of the set of the descriptions can be assigned a value (e.g., scored). For example, the descriptions can be associated with a score that can be a number within a sequence of numbers comprising a scale. The scores can include, for example, the numbers 1, 2, and 3. For example, the description describing a low breach history associated with the product 342 can be assigned a score of 1. The description describing a medium breach history associated with the product 342 can be assigned a score of 2. The description describing a high breach history associated with the product 342 can be assigned a score of 3.

The criticality calculator 346 can provide the plurality of descriptions to a user device. The user device can select descriptions from the plurality of descriptions. Alternatively, the criticality calculator 346 can select descriptions from the plurality of descriptions based on an analysis of the product 342 and/or inputs descriptive of the product 342.

The criticality calculator 346 can calculate a criticality score for the product 342 based on the selected descriptions. For example, the criticality calculator 346 can calculate a criticality score for the product 342 by aggregating the values (e.g., scores) assigned to the selected descriptions. Each of the scores of the selected descriptions can be assigned a weight to provide each description an amount of influence over the sum in accordance with the impact the component has on the criticality score. The weight assigned to a scored description within the aggregation can be predetermined and/or modifiable by the business associated with the product 342. In this manner, the criticality score is highly customizable to the tolerances and goals of the business. In an example, the selected scored description of the set of descriptions characterizing an amount of revenue can be assigned a thirty percent weight, the selected scored description of the set of descriptions characterizing an business strategy can be assigned a twenty percent weight, the selected scored description of the set of descriptions characterizing a type of information can be assigned a twenty percent weight, the selected scored description of the set of descriptions characterizing a deployment model can be assigned a twenty percent weight, and the selected scored description of the set of descriptions characterizing a breach history can be assigned a ten percent weight.

The criticality calculator 346 can compare the criticality score for the product 342 to a plurality of thresholds to determine a product criticality characterization (e.g., level). A product criticality level includes a description of a qualitative and/or quantitative description of which of a plurality of product criticality levels the criticality score fall within, wherein the levels are defined by threshold criticality scores. For example, a high product criticality level can include criticality scores for a product 342 that are greater than or equal to a criticality score of two. A medium product criticality level can include criticality scores for a product 342 that are greater than or equal to a criticality score of one and one half and/or less than a criticality score of two. A low product criticality level can include criticality scores for a product 342 that are less than a criticality score of one and one half. The thresholds to determine a product criticality level are modifiable by a business and/or a user device in order to adapt to changing tolerances and goals of the business.

The vulnerability calculator 348 can calculate a vulnerability score for the product 342. For example, the vulnerability calculator 348 can calculate a vulnerability score for the product 342 based on score inputs collected during a security assessment. A score input can be received during the development of the product 342 (e.g., during planning, implementation, testing, documenting, deploying, maintaining, etc.). As used herein, a score input includes a description of a security risk element for the product 342 (e.g., a software application). A score input can be received as a response to an output (e.g., a question addressing a segment of a comprehensive security coverage framework). The response can include a selection of a description from a number of predetermined descriptions that each describe an answer to the question posed to a user device and/or included as part of an assessment of a product 342. The number of predetermined descriptions can include a set of predetermined descriptions each providing a portion of coverage of a range, scale, and/or continuum of possible classifications of a potential exploiting of a security vulnerability of the product 342 as it relates to a security risk element addressed in the question. As used herein, the descriptions can include characterizations of security metrics useful in classifying and/or quantifying security risk elements.

The outputs can include questions. The questions can address segments of a comprehensive security coverage framework by addressing a security metric of a plurality of security metrics. The plurality of security metrics can cumulatively classify and/or quantify a plurality of segments of a comprehensive security coverage framework. The plurality of segments of a comprehensive security coverage framework can represent components of a composite risk index including an impact component representing an impact of a risk event (e.g., exploitation of a security vulnerability) and a likelihood component including a probability of a risk event (e.g., exploitation of a security vulnerability) occurrence.

The plurality of segments of a comprehensive security coverage framework can include an impact potential segment, a reconstructing segment, an attack vectors segment, a coverage spread segment, and/or an identify and exploit segment. As used herein, an impact potential segment is a segment of a comprehensive security coverage framework including the potential impact of an exploitation of a security vulnerability of a product 342 being analyzed. The security vulnerability can be a hypothetical security vulnerability. For example, the product 342 can be analyzed relatively early (e.g., before deployment of the product 342, before a maintenance phase for the product 342, etc.) in the development process. Further, a potential and/or hypothetical security vulnerability can be identified based on a description of a product 342 and/or a description of a plan for the product 342. The potential and/or hypothetical security vulnerability can be identified in an early iteration of the product 342 and/or application plan, allowing for early correction and conservation of developing resources. That is identification of potential and/or hypothetical security vulnerabilities allowing for early risk mitigation measures can conserve resources that would otherwise be wasted in mitigating risk upon discovery in a completed product.

The impact potential segment can be addressed by a question of the type discussed above. As used herein, the question is provided via a computing device. The question can include a portion of a phrase. The portion of the phrase can include a designation of a risk element, a prompt to respond, and/or a query regarding a risk element. The security risk element can include a security metric that classifies and/or quantifies an element of an impact potential segment of a comprehensive security coverage framework.

The security risk element can include a confidentiality impact of a potential exploitation of the security vulnerability. As used herein a confidentiality impact of potential exploitation of the security vulnerability can include a type of data being processed, stored, and/or utilized by the product 342 and/or the negative potential of exploitation of a security vulnerability exposing that data to unpermitted entities. The question can therefore include a prompt to characterize a metric of the product 342 that is associated with the security risk element. For example, the question can include a prompt to characterize the type of data being processed, stored, and/or utilized by the product 342 and/or the negative potential of exploitation of a vulnerability exposing that data to unpermitted entities. The characterization can include a description selected from a set of descriptions each providing a portion of coverage of a range, scale, and/or continuum of possible classifications and/or quantification of security metrics the product 342 as it relates to a confidentiality impact of potential exploitation of the security vulnerability.

The set of descriptions can include a description describing the confidentiality impact of potential exploitation of the security vulnerability as "no," "low," "intermediate," and/or "high." A "no" confidentiality impact description can include where a product 342 does not process, store, or utilize any potentially damaging data (e.g., sensitive organizational data, sensitive customer data, internal system data, master encryption key, etc.). Additionally, a "no" confidentiality impact description can include where the impact is quantified (e.g., impact score, data sensitivity score, quantity of sensitive data, etc.) and the quantified impact is below a predetermine threshold value.

A "low" confidentiality impact can include where a potential exploitation of a security vulnerability of the product 342 exposes trivial and/or public information to unauthorized entities. For example, a "low" confidentiality impact can include where the product 342 processes, stores, and/or utilizes trivial and/or public information. Additionally a "low" confidentiality impact can include where the confidentiality impact of a potential exploitation of a security vulnerability of the product 342 is quantified (e.g., impact score, data sensitivity score, quantity of sensitive data, etc.) and the quantified confidentiality impact is between two predetermine threshold values.

An "intermediate" confidentiality impact can include where a potential exploitation of a security vulnerability of the product 342 exposes a portion of sensitive data and/or internal system data. For example, an "intermediate" confidentiality impact can include where the product 342 processes, stores, and/or utilizes sensitive data and/or internal system data, a portion of which can be exposed via exploitation of a security vulnerability. Additionally, An "intermediate" confidentiality impact can include where the confidentiality impact of a potential exploitation of a security vulnerability of the product 342 is quantified (e.g., impact score, data sensitivity score, quantity of sensitive data, etc.) and the quantified confidentiality impact is between two predetermine threshold values, where the lower threshold value is greater than the upper threshold value of the predetermined upper threshold value of the low confidentially impact.

A "high" confidentially impact can include where a potential exploitation of a security vulnerability of the product 342 exposes a portion of sensitive data exceeding a threshold and/or data comprising sensitive assets (e.g., sensitive organizational data, sensitive customer data, internal system data, master encryption key, etc.). Additionally, a "high" confidentially impact can include where the confidentiality impact of a potential exploitation of a security vulnerability of the product 342 is quantified (e.g., impact score, data sensitivity score, quantity of sensitive data, etc.) and the quantified confidentiality impact is above a predetermine threshold value.

Each description of the set of the descriptions can be scored by a score calculator. For example, the descriptions can be associated with a score that can be a number within a sequence of numbers comprising a scale. The scores can include, for example, the numbers 0, 1, 2, and 3. For example, the description describing the confidentiality impact of a potential exploitation of a security vulnerability as "no" impact can be associated with a score of 0. The description describing the confidentiality impact of a potential exploitation of a security vulnerability as "low" (e.g., potentially exposing trivial and/or public information, etc.) can be associated with a score of 1. The description describing the confidentiality impact of a potential exploitation of a security vulnerability as "intermediate" (e.g., potentially exposing a portion of sensitive data and/or internal system data, etc.) can be associated with a score of 2. The description describing the confidentiality impact of a potential exploitation of a security vulnerability "high" (e.g., potentially exposing a portion of sensitive data exceeding a threshold and/or data comprising sensitive assets, etc.) can be associated with a score of 3.

A selection of a scored description of the set of descriptions associated with the confidentiality impact can be received as an input and the score can be associated with the confidentiality impact security risk element. That is, the confidentiality impact security risk element can be scored according to the score associated with the selected description.

Additionally, the security risk element can include an integrity impact of a potential exploitation of a security vulnerability. As used herein, an integrity impact is a level of control ceded during exploitation of a security vulnerability and/or the potential damage to the data and/or integrity of an entity associated with the product 342 by an exploitation of the security vulnerability. The question associated with the integrity impact can include a question prompting a characterization of the level of control ceded during exploitation of a security vulnerability and/or the potential damage to the data and/or integrity of an entity associated with the product 342 by an exploitation of the security vulnerability. The characterization can include a description selected from a set of descriptions each providing a portion of coverage of a range, scale, and/or continuum of possible classifications and/or quantifications of security metrics of the product 342 as it relates to an integrity impact of a potential exploitation of the security vulnerability.

The set of descriptions can include a description describing the integrity impact of potential exploitation of the security vulnerability as "no," "low," "intermediate," and/or "high." A "no" integrity impact can include where there is not an opportunity for exploitation of the security vulnerability to result in unauthorized control of the product 342 and/or a resources of the product 342. Additionally, a "no" integrity impact can include where there is no chance that unauthorized control can damage the data and/or integrity of an entity associated with the product 342 (e.g., a business, organization, application developer, application provider, cloud services provider, etc.). A "no" integrity impact can include where the integrity impact of a potential exploitation of the security vulnerability of the product 342 is quantified (e.g., integrity damage score, confidence in product score, percentage of takeover possible, percentage of defacement possible, integrity value of assets that can be taken over, level of impersonation score, impersonation potential damage score, scored amount of damage to core business, scored amount of damage to data, etc.) and the quantified integrity impact is below a predetermined threshold value.

A "low" integrity impact can include where a potential exploitation of a security vulnerability of the product 342 exposes public information that can be spoofed by an unauthorized entity to masquerade as a customer and/or an organization (e.g., an business, a cloud services provider, an application developer, application provider, etc.) associated with the product 342 utilizing the public information. Additionally, a "low" integrity impact can include where a potential exploitation of a security vulnerability of the product 342 can cause minor damage (e.g., a contained data loss and/or data leak of relatively small amount of data including easily recoverable, non-critical, and/or publically available data) to a core business associated with the product 342 (e.g., a core business of the organization) and/or minor damage (e.g., a contained data loss and/or data leak of a relatively small amount of data including easily recoverable, non-critical, and/or non-personally identifiable information) to customers' data. Minor damage to a core business can include a quantified amount of damage below a predetermined damage threshold. Minor damage to customers' data can include a quantified amount of damage below a predetermined damage threshold. Additionally, the potential exploitation of a product 342 security vulnerability can be described as having a low integrity impact where the integrity impact is quantified (e.g., integrity damage score, confidence in product score, percentage of takeover possible, percentage of defacement possible, integrity value of assets that can be taken over, level of impersonation score, impersonation potential damage score, scored amount of damage to core business, scored amount of damage to data, etc.) and the quantified integrity impact is between two predetermine threshold values.

An "intermediate" integrity impact can include where a potential exploitation of a security vulnerability of the product 342 exposes a portion of sensitive data that can be utilized in a partial impersonation by an unauthorized entity of a customer and/or an organization (e.g., a business, a cloud provider, a software developer, etc.) associated with the product 342 by utilizing the portion of sensitive data. Additionally, an "intermediate" integrity impact can include where a potential exploitation of a security vulnerability of the product 342 exposes some of the application data to unauthorized modification and/or exposes customer data and/or the core business associated with the product 342 to an intermediate level of damage (e.g., a data loss and/or data leak of a relatively large amount of data including a relatively small amount of sensitive information, confidential information, and/or personally identifiable information). An intermediate level of damage to the core business and/or customer data can include a quantified amount of damage between two predetermined thresholds of damage quantities. Additionally, an "intermediate" integrity impact can include where the integrity impact of a potential exploitation of a security vulnerability is quantified (e.g., integrity damage score, confidence in product score, percentage of takeover possible, percentage of defacement possible, integrity value of assets that can be taken over, level of impersonation score, impersonation potential damage score, scored amount of damage to core business, scored amount of damage to data, etc.) and the quantified integrity impact is between two predetermined threshold values, where the lower threshold value is greater than the upper threshold value of the predetermined upper threshold value of the "low" integrity impact.

A "high" integrity impact can include where a potential exploitation of a security vulnerability of the product 342 exposes a relatively larger portion (than the "intermediate" integrity impact portion) of sensitive data that can be utilized in a full impersonation of a customer and/or a core business (e.g., a core business of an organization associated with providing the product 342) associated with the product 342. A "high" integrity impact can include where a potential exploitation of a security vulnerability of the product 342 exposes the product 342 and/or its related resources to persistent defacement. For example, a "high" integrity impact can include where a potential exploitation of a security vulnerability of the product 342 exposes a server associated with the application to takeover by unauthorized entities. A "high" integrity impact can also include where a potential exploitation of a security vulnerability of the product 342 causes major damage (e.g., a large and/or uncontained data loss and/or leak including a large portion of sensitive information, confidential information, and/or personally identifiable information) to a core business associated with the product 342 and/or customer data. Major damage can include a quantified amount of damage to a core business and/or customer data exceeding a predetermined threshold of damage.

Each description of the set of the descriptions can be scored by a score calculator. For example, the descriptions can be associated with a score that can be a number within a sequence of numbers comprising a scale. The scores can include, for example, the numbers 0, 1, 2, and 3. For example, the description describing the integrity impact of a potential exploitation of a security vulnerability as "no" impact can be associated with a score of 0. The description describing the integrity impact of a potential exploitation of a security vulnerability as "low" (e.g., potentially exposing public information that can be spoofed by an unauthorized entity to masquerade as a customer and/or a business associated with the product 342 based on the public information) can be associated with a score of 1. The description describing the integrity impact of a potential exploitation of a security vulnerability as "intermediate" (e.g., potentially exposing a portion of sensitive data that can be utilized in a partial impersonation by an unauthorized entity of a customer and/or a business associated with the product 342 based on the portion of sensitive data) can be associated with a score of 2. The description describing the integrity impact of a potential exploitation of a security vulnerability as "high" (e.g., potentially exposing a portion of sensitize data that can be utilized in a full impersonation of a customer and/or a business associated with the product 342) can be associated with a score of 3.

A selection of a scored description of the set of descriptions associated with the integrity impact can be received as an input and the score can be associated with the integrity impact security risk element. That is, the integrity impact security risk element can be scored according to the score associated with the selected description.

The security risk element can include an availability impact of a potential exploitation of the security vulnerability. As used herein, an availability impact includes an impact of a potential exploitation of a security vulnerability on the availability of the product 342. The question associated with the availability impact can include a question prompting a characterization of the impact of a potential exploitation of a security vulnerability on availability of the product 342, any data loss associated with that availability impact, and/or a business effect of the availability impact. The characterization can include a description selected from a set of descriptions each providing a portion of coverage of a range, scale, and/or continuum of possible classifications and/or quantifications of security metrics of the product 342 as it relates to an availability impact of a potential exploitation of a security vulnerability.

The set of descriptions can include a description describing the availability impact of potential exploitation of the security vulnerability as "no," "low," "intermediate," and/or "high." A "no" availability impact can include where there is not an inherent opportunity for a security vulnerability exploitation to affect the availability of the product 342, resources associated with the product 342, and/or associated critical services, etc.

A "low" availability impact can include where a potential exploitation of a security vulnerability of the product 342 exposes a relatively small amount (e.g., an amount of users below a predetermined threshold of users) to a denial of service (DoS) (e.g., rendering a machine, network resource, service, and/or product 342 unavailable to its intended users). The description can describe the duration of any potential DoS. For example, the duration can be described as a short time window and/or be described as a predicted quantity of time of a DoS that falls below a predetermined threshold. Further, the description can describe the availability impact of a potential exploitation of a security vulnerability as ultimately causing no business effect and/or a business effect falling below a predetermined threshold.

An "intermediate" availability impact can include where a potential exploitation of a security vulnerability exposes a limited group of users to a DoS. The limited group can be a specific subset of users. The limited group can be a quantity of users potentially subject to a DoS where the quantity is between two predetermined thresholds.

Additionally, the description can describe the duration of any potential DoS. For example, the duration can be described as a "limited" time window and/or be described as a predicted quantity of time of a DoS that falls between two predetermined thresholds.

The description can also describe the type and/or quantity of each type of each service that could be affected by a DoS caused by potential exploitation of the security vulnerability. For example, the type of affected services can be described as "limited" services and/or "non-critical" services. An alteration in the availability of a limited number of services can include an alteration in the availability of a portion of all the services associated with the product 342. The portion can be a quantity below a predetermined threshold and/or a predetermined category of services. A non-critical service can include a service that is not critical or a service of limited criticality to the function of the product 342. For example, a non-critical service can fault and/or fail to come online without causing an associated product 342 to fail.

Additionally, the description can describe a quantity of data loss associated with exploitation of the security vulnerability. The quantity of data loss can include a characterization of the data loss, such as a "partial" data loss (e.g., loss of a portion of the data). The characterization can be based on the quantity of data loss in relation to one or more predetermined thresholds.

A "high" availability impact can include where a potential exploitation of a security vulnerability exposes a large amount of users (e.g., an amount of users greater than a predetermined threshold) and/or all users of a product 342 to a denial of service (DoS).

The description can describe the duration of any potential DoS. For example, the duration can be described as a relatively "long" time window (e.g., a longer time window compared to services not experiencing a DoS, more than a day, a period of time that prevents a user from regular periodic use, etc.) and/or be described as a predicted quantity of time of a DoS that is greater than a predetermined threshold.

The description can also describe the type of services that could be affected by a DoS caused by exploiting the security vulnerability. For example, the type of services can be described as "critical" services. Critical service can include a service that is critical to the function of the product 342. For example, when a critical service faults and/or fails to come online a DoS for the entire product 342 can occur.

Additionally, the description can describe a quantity of data loss associated with exploitation of the security vulnerability. The quantity of data loss can include a characterization of the data loss, such as a "major" data loss (e.g., loss of a large portion of the data and/or loss of extremely sensitive data). The characterization can be based on the quantity of data loss in relation to one or more predetermined thresholds.

Each description of the set of the descriptions can be scored by a score calculator. For example, the descriptions can be associated with a score that can be a number within a sequence of numbers comprising a scale. The scores can include, for example, the numbers 0, 1, 2, and 3. For example, the description describing the availability impact of a potential exploitation of a security impact as having as "no" impact can be associated with a score of 0. The description describing the availability impact of a potential exploitation of a security impact as a "low" availability impact (e.g., potentially creating a short term DoS for a small amount of users, with no business affect) can be associated with a score of 1. The description describing the availability impact of a potential exploitation of a security vulnerability as an "intermediate" availability impact (e.g., potentially causing a DoS for a limited group of users for a limited time, with partial data loss) can be associated with a score of 2. The description describing the availability impact as a "high" availability impact (e.g., a potential exploitation of a security impact as potentially creating an application-wide DoS for a long time window for a large group of users resulting in major data loss) can be associated with a score of 3.

A selection of a scored description of the set of descriptions associated with the availability impact can be received as an input and the score can be associated with the availability impact security risk element. That is, the availability impact security risk element can be scored according to the score associated with the selected description.

As used herein, a reconstructing segment includes a segment of a comprehensive security coverage framework including the potential ability to reconstruct an exploitation of a security vulnerability of a product 342 being analyzed. The security vulnerability can be a hypothetical security vulnerability. For example, the product 342 can be analyzed early in the development process. Further, a potential and/or hypothetical security vulnerability can be identified based on a description of a product 342 and/or a description of a plan for the product 342. The potential and/or hypothetical security vulnerability can be identified in an early iteration of the product 342 and/or application planning, allowing for early correction and conservation of developing resources. As used herein, the reconstructing segment can be addressed by a question. As used herein, the question can be provided via a computing device. The question can include a portion of a phrase. The portion of the phrase can include a designation of a risk element, a prompt to respond, and/or a query regarding a risk element. The security risk element can include a security metric that classifies and/or quantifies an element of a reconstructing segment of a comprehensive security coverage framework.

The security risk element can include a reproducibility of an exploitation of the security vulnerability. As used herein a reproducibility includes the effort with which the security vulnerability can be repeatedly exploited. The question can therefore include a prompt to characterize a metric of the product 342 that is associated with the reproducibility security risk element. For example, the question can include a prompt to characterize a difficulty associated with reproducing a security vulnerability exploit. The characterization can include a description selected from a set of descriptions each providing a portion of coverage of a range, scale, and/or continuum of possible classifications and/or quantifications of a potential exploitation of the product 342 as it relates to a reproducibility of a security vulnerability and/or its exploitation.

The set of descriptions can include a description describing the reproducibility impact of potential exploitation of the security vulnerability as ""low,") "intermediate," and/or "high." A "low" reproducibility impact can include where the reproducibility of a potential exploitation of a security vulnerability of a product 342 is relatively rare. For example, a "low" reproducibility impact can include where the exploitation of a security vulnerability of the product 342 is relatively difficult (e.g., technically sophisticated and extensive pre-conditions are required) to reproduce even when the security flaw is well known. For example, where a quantity and/or quality of preconditions to reproduce the security vulnerability exploit are above a predetermined threshold, the reproducibility may be described as rare.

An "intermediate" reproducibility impact can include where the reproducibility of a potential exploitation of a security vulnerability of a product 342 is relatively limited. A reproducibility of a security vulnerability exploitation for a product 342 can be described as limited where, for example, it involves an intermediate level of sophistication and preconditions to reproduce. For example, an "intermediate" reproducibility impact can include where the quantity of preconditions to reproduce the security vulnerability exploit is between two predetermined thresholds. Additionally, an "intermediate" reproducibility impact can include where the reproducibility of a potential exploitation of a security vulnerability of a product 342 the time window for reproducing the security vulnerability exploitation is limited and/or is a quantity of time below a predetermined threshold.

A "high" reproducibility impact can include where the reproducibility of a potential exploitation of a security vulnerability of a product 342 is relatively common. The reproducibility impact of a security vulnerability exploitation for a product 342 can be described as common where, for example, the quantity of preconditions to reproduce the security vulnerability exploit is above a predetermined threshold. Additionally, a "high" reproducibility impact can include where the time window for reproducing the security vulnerability exploitation is a quantity of time below a predetermined threshold.

Each description of the set of the descriptions can be scored by a score calculator. For example, the descriptions can be associated with a score that can be a number within a sequence of numbers comprising a scale. The scores can include, for example, the numbers 1, 2, and 3. For example, the description describing the reproducibility as "low" (e.g., the exploitation is very difficult to reproduce, reproducing the exploitation involves technically sophisticated and extensive pre-conditions, even when the security flaw is well known preconditions and extensive knowledge are involved in its exploit, a quantity and/or quality of preconditions to reproduce the security vulnerability exploit are below a predetermined threshold, etc.) can be associated with a score of 1. The description describing the reproducibility as "intermediate" (e.g., the exploit involves an intermediate level of sophistication and preconditions to reproduce, the quantity of preconditions to reproduce the security vulnerability exploit is between two predetermined thresholds, the time window for reproducing the security vulnerability exploitation is limited and/or is a quantity of time below a predetermined threshold, etc.) can be associated with a score of 2. The description describing the reproducibility as "high" (e.g., the quantity of preconditions to reproduce the security vulnerability exploit is below a predetermined threshold, the time window for reproducing the security vulnerability exploitation is a quantity of time above a predetermined threshold, etc.) can be associated with a score of 3.

A selection of a scored description of the set of descriptions associated with the reproducibility can be received as an input and the score can be associated with the reproducibility security risk element. That is, the reproducibility security risk element can be scored according to the score associated with the selected description.

As used herein, an attack vectors segment includes a segment of a comprehensive security coverage framework including the skills and vectors involved in exploiting the security vulnerability of the product 342 being analyzed. The security vulnerability can be a hypothetical security vulnerability. For example, the product 342 can be analyzed early in the development process. Further, a potential and/or hypothetical security vulnerability can be identified based on a description of a product 342 and/or a description of a plan for the product 342. The potential and/or hypothetical security vulnerability can be identified in an early iteration of the product 342 and/or application planning, allowing for early correction and conservation of developing resources.

As used herein, the attack vectors segment can be addressed by a question. As used herein, the question can be provided via a computing device. The question can include a portion of a phrase. The portion of the phrase can include a designation of a risk element, a prompt to respond, and/or a query regarding a risk element. The security risk element can include a security metric that classifies and/or quantifies an element of an attack vectors segment of a comprehensive security coverage framework.

The security risk element can include attack skills associated with exploiting the security vulnerability. As used herein, attack skills can include the skills and or utilities involved in exploiting the security vulnerability. The question can therefore include a prompt to characterize a metric of the product 342 that classifies and/or quantifies the security risk element. For example, the question can include a prompt to characterize the level of skill/knowledge involved in exploiting the security vulnerability, the amount of time involved in exploiting the security vulnerability, and the utilities involved in exploiting the security vulnerability. The characterization can include a description selected from a set of descriptions each providing a portion of coverage of a range, scale, and/or continuum of possible classifications and/or quantifications of the product 342 as it relates to attack skills associated with exploiting the security vulnerability.

The set of descriptions can include a description describing the attack skills involved in a potential exploitation of the security vulnerability as ""low," "intermediate," and/or "high." A "high" attack skill can include where the acquisition and implementation of the skills involved in exploiting a security vulnerability of the product 342 are relatively difficult. For example, where high level programming and/or hacking skills, internal knowledge of the product 342, and/or a large quantity of time is involved in exploiting the security vulnerability. A "high" attack skill can include where the programming and/or hacking skills, internal knowledge of the product 342, and/or a quantity of time involved in exploiting the security vulnerability exceeds a predetermined threshold.

An "intermediate" attack skill can include where the acquisition and implementation of the skills involved in exploiting a security vulnerability of the product 342 are of relatively intermediate difficulty. For example, where an intermediate level of programming and/or hacking skills are utilized in exploiting the security vulnerability, preparing the exploit takes a few hours to a few days, and/or once exploited an exploit can be repeated with minimal additional effort. An "intermediate" attack skill can include where the programming and/or hacking skills, exploit preparation time, and/or an amount of effort to repeat the exploitation of the security vulnerability are between two predetermined thresholds.

A "low" attack skill can include where the acquisition and implementation of the skills involved in exploiting a security vulnerability of the product 342 are relatively easy. For example, where minimal special programming and/or hacking skills are utilized in exploiting the security vulnerability, the security vulnerability can be exploited using commonly available exploiting tools, the security vulnerability can be exploited reusing commonly available public exploits, and/or preparing the exploit takes a small quantity of time. A "low" attack skill can include where the programming and/or hacking skills and/or exploit preparation time are below predetermined threshold.

Each description of the set of the descriptions can be scored by a score calculator. For example, the descriptions can be associated with a score that can be a number within a sequence of numbers comprising a scale. The scores can include, for example, the numbers 1, 2, and 3. For example, the description describing the attack skills as "high" (e.g., high level programming and/or hacking skills, internal knowledge of the product 342, and/or a large quantity of time is involved in exploiting the security vulnerability, the programming and/or hacking skills, internal knowledge of the product 342, and/or a quantity of time involved in exploiting the security vulnerability exceeds a predetermined threshold) can be associated with a score of 1. The description describing the attack skills as "intermediate" (e.g., an intermediate level of programming and/or hacking skills are utilized in exploiting the security vulnerability, preparing the exploit takes a few hours to a few days, once exploited an exploit can be repeated with minimal additional effort, the programming and/or hacking skills, exploit preparation time, and/or an amount of effort to repeat the exploitation of the security vulnerability are between two predetermined thresholds) can be associated with a score of 2. The description describing the attack skills as "low" (e.g., minimal special programming and/or hacking skills are utilized in exploiting the security vulnerability, the security vulnerability can be exploited using commonly available exploiting tools, the security vulnerability can be exploited reusing commonly available public exploits, preparing the exploit takes a small quantity of time, the programming and/or hacking skills and/or exploit preparation time are below predetermined threshold, etc.) can be associated with a score of 3.

A selection of a scored description of the set of descriptions associated with the attack skills can be received as an input and the score can be associated with the attack skills security risk element. That is, the attack skills security risk element can be scored according to the score associated with the selected description.

The security risk element can include access vectors associated with exploiting the security vulnerability. As used herein, access vectors include the type of access involved in exploiting the security vulnerability. The question can therefore include a prompt to characterize a metric classifying and/or quantifying the security risk element of the product 342. For example, the question can include a prompt to characterize the type of access to a system associated with the product 342 involved in exploiting the security vulnerability. The characterization can include a description selected from a set of descriptions each providing a portion of coverage of a range, scale, and/or continuum of possible classifications of the product 342 as it relates to access vectors associated with exploiting the security vulnerability.

The set of descriptions can include a description describing the access vectors involved in a potential exploitation of the security vulnerability as ""low," "intermediate," and/or "high." A "low" access vector can include where access to the product 342 is restricted to limited and/or secure internal access. For example, a "low" access vector can include where an exploiting entity utilizes physical access to the system having the security vulnerability and/or a local account (e.g., having identity verification and/or authorization control measures in place) with the system having the security vulnerability to affect the exploit.

An "intermediate" access vector can include where access to the product 342 is available through internal access. An "intermediate" access vector can include where, for example, an exploiting entity utilizes physical access to the system having the security vulnerability without any identity verification and/or authorization control measures in place and/or an adjacent network (e.g., accessing a broadcast or collision domain of the system having the security vulnerability).

A "high" access vector can include where access to the product 342 is available through external access. External access can include where, for example, an exploiting entity is able to remotely exploit the security vulnerability utilizing a separate network and/or a network layer above the layer that includes the security vulnerability.

Each description of the set of the descriptions can be scored by a score calculator. For example, the descriptions can be associated with a score that can be a number within a sequence of numbers comprising a scale. The scores can include, for example, the numbers 1, 2, and 3. For example, the description describing the access vectors as "low" (e.g., an exploiting entity utilizes physical access to the system having the security vulnerability, an exploiting entity utilizes a local account having identity verification and/or authorization control measures in place, etc.) can be associated with a score of 1. The description describing the access vectors as "intermediate" (e.g., an exploiting entity utilizes physical access to the system having the security vulnerability without any identity verification and/or authorization control measures in place, an exploiting entity utilizes an adjacent network, an exploiting entity utilizes access to a broadcast or collision domain of the system having the security vulnerability to gain access for the exploit, etc.) can be associated with a score of 2. The description describing the access vectors as "high" (e.g., an exploiting entity is able to remotely exploit the security vulnerability utilizing a separate network and/or a network layer above the layer including the security vulnerability, etc.) can be associated with a score of 3.

A selection of a scored description of the set of descriptions associated with the access vectors can be received as an input and the score can be associated with the access vectors security risk element. That is, the access vectors security risk element can be scored according to the score associated with the selected description.

As used herein, a coverage spread segment includes a segment of a comprehensive security coverage framework including the affected users and/or tenants of a potential exploit of a security vulnerability of the product 342 being analyzed. The security vulnerability can be a hypothetical security vulnerability. For example, the product 342 can be analyzed early in the development process. Further, a potential and/or hypothetical security vulnerability can be identified based on a description of a product 342 and/or a description of a plan for the product 342. The potential and/or hypothetical security vulnerability can be identified in an early iteration of the product 342 and/or application planning, allowing for early correction and conservation of developing resources.

As used herein, the coverage spread segment can be addressed by a question. As used herein, the question can be provided via a computing device. The question can include a portion of a phrase. The portion of the phrase can include a designation of a risk element, a prompt to respond, and/or a query regarding a risk element. The security risk element can include a security metric that classifies and/or quantifies an security risk element of a coverage spread segment of a comprehensive security coverage framework.

The security risk element can include affected tenants of a security vulnerability exploitation. As used herein, affected tenants includes tenants of the product 342 and/or a system associated with the product 342 that are adversely affected (e.g., DoS, loss of access to the product 342, loss of tenant data, compromised sensitive information of the tenant, etc.) by exploitation of the security vulnerability. The question can therefore include a prompt to characterize a metric of the product 342 that is associated with the security risk element. For example, the question can include a prompt to characterize the tenants affected by exploitation of the security vulnerability. The characterization can include a description selected from a set of descriptions each providing a portion of coverage of a range, scale, and/or continuum of possible classifications and/or quantifications of the product 342 as it relates to tenants affected by exploiting the security vulnerability.

The set of descriptions can include a description describing the affected tenants of a potential exploitation of the security vulnerability as "none," "low," "intermediate," and/or "high." Affected tenants can be described as "none" where, for example, exploitation of the security vulnerability does not affect a tenant. For example, affected tenants can be described as "none" where the product 342 is a non-software as a service product and/or is utilized by users and not tenants.

Affected tenants can be described as "low" where, for example, a single tenant and/or a quantity and/or percentage of affected tenants resulting from exploitation of the security vulnerability is below a predetermined threshold of affected tenants.

Affected tenants can be described as "intermediate" where, for example, a quantity and/or percentage of affected tenants resulting from exploitation of the security vulnerability is between two predetermined thresholds of affected tenants.

Affected tenants can be described as "high" where, for example, a quantity and/or percentage of affected tenants resulting from exploitation of the security vulnerability exceeds a predetermined threshold of affected tenants.

Each description of the set of the descriptions can be scored by a score calculator. For example, the descriptions can be associated with a score that can be a number within a sequence of numbers comprising a scale. The scores can include, for example, the numbers 0, 1, 2, and 3. For example, the description describing the affected tenants as "none" (e.g., exploitation of the security vulnerability does not affect a tenant, the product 342 is a non-software as a service product, etc.) can be associated with a score of 0. For example, the description describing the affected tenants as "low" (e.g., a single tenant is affected by exploit of the security vulnerability, a quantity or percentage of affected tenants resulting from exploitation of the security vulnerability is below a predetermined threshold of affected tenants, etc.) can be associated with a score of 1. The description describing the affected tenants as "intermediate" (e.g., a quantity and/or percentage of affected tenants resulting from exploitation of the security vulnerability is between two predetermined thresholds of affected tenants, etc.) can be associated with a score of 2. The description describing the tenants as "high" (e.g., a quantity and/or percentage of affected tenants resulting from exploitation of the security vulnerability exceeds a predetermined threshold of affected tenants, eta) can be associated with a score of 3.

A selection of a scored description of the set of descriptions associated with the affected tenants can be received as an input and the score can be associated with the affected tenants security risk element. That is, the affected tenants security risk element can be scored according to the score associated with the selected description.

The security risk element can include users affected by a security vulnerability exploitation. As used herein, affected users includes users of the product 342 and/or a system associated with the product 342 that are adversely affected (e.g., DoS, loss of access to the product 342, loss of user data, compromised sensitive information of the users, etc.) by exploitation of the security vulnerability. The question can therefore include a prompt to characterize a metric of the product 342 that is associated with the security risk element. For example, the question can include a prompt to characterize the users affected by exploitation of the security vulnerability. The characterization can include a description selected from a set of descriptions each providing a portion of coverage of a range, scale, and/or continuum of possible classifications and/or quantifications of the product 342 as it relates to affected users from exploiting the security vulnerability.

The set of descriptions can include a description describing the affected users of a potential exploitation of the security vulnerability as "low," "intermediate," and/or "high." Affected users can be described as "low" where a potential exploitation of the security vulnerability of the product 342 affects a relatively a small group of users. For example, affected users can be described as "low" where a potential exploitation of the security vulnerability of the product 342 affects a quantity and/or percentage of users that is below a predetermined threshold of affected users (e.g., below ten percent of users).

Affected users can be described as "intermediate" where a potential exploitation of the security vulnerability of the product 342 affects a quantity and/or percentage of users that is between two predetermined thresholds of affected users (e.g., from ten percent to forty percent).

Affected users can be described as "high" where a potential exploitation of the security vulnerability of the product 342 affects a quantity and/or percentage of users exceeds a predetermined threshold of affected users (e.g., over forty percent).

Each description of the set of the descriptions can be scored by a score calculator. For example, the descriptions can be associated with a score that can be a number within a sequence of numbers comprising a scale. The scores can include, for example, the numbers 1, 2, and 3. For example, the description describing the affected users as a "low" (e.g., a relatively small group, a quantity and/or percentage of affected users resulting from exploitation of the security vulnerability is below a predetermined threshold of affected users, etc.) can be associated with a score of 1. The description describing the affected users as an "intermediate" (e.g., a relatively intermediately sized group, a quantity and/or percentage of affected users resulting from exploitation of the security vulnerability is between two predetermined thresholds of affected users, etc.) can be associated with a score of 2. The description describing the affected users as "high" (e.g., a relatively large group, a quantity and/or percentage of affected users resulting from exploitation of the security vulnerability exceeds a predetermined threshold of affected users, etc.) can be associated with a score of 3.

A selection of a scored description of the set of descriptions associated with the affected users can be received as inputs and the score can be associated with the affected users security risk element. That is, the affected users security risk element can be scored according to the score associated with the selected description.

As used herein, an identify and exploit segment includes a segment of a comprehensive security coverage framework including the skills and application surfaces involved in exploitation of the security vulnerability of the product 342. The security vulnerability can be a hypothetical security vulnerability. For example, the product 342 can be analyzed early in the development process. Further, a potential and/or hypothetical security vulnerability can be identified based on a description of a product 342 and/or a description of a plan for the product 342. The potential and/or hypothetical security vulnerability can be identified in an early iteration of the product 342 and/or application planning, allowing for early correction and conservation of developing resources.

As used herein, the identify and exploit segment is be addressed by a question. As used herein, the question is provided via a computing device. The question can include a portion of a phrase. The portion of the phrase can include a designation of a risk element, a prompt to respond, and/or a query regarding a risk element. The security risk element can include a security metric that classifies and/or quantifies a security risk element of coverage spread segment of a comprehensive security coverage framework.

The security risk element can include skills involved in identification of a security vulnerability and/or its exploitation. As used herein, skills involved in identification of a security vulnerability and/or its exploitation includes skills, knowledge, utilities and/or efforts involved in identification of a security vulnerability and/or its exploitation. The question can therefore include a prompt to characterize a metric of the product 342 that is associated with the security risk element. For example, the question can include a prompt to characterize the skills, knowledge, utilities and/or efforts involved in identification of a security vulnerability and/or its exploitation.

The set of descriptions can include a description describing the identification/exploitation skills as "low," "intermediate," and/or "high." A "high" identification/exploitation skills can include where the skills involved to identify and exploit the security vulnerability of the product 342 are relatively uncommon (e.g., not present in the majority of the population, can only be acquired through specialized training and/or courses, are only possessed by a quantity of a population below a predetermined threshold, etc.). For example, A "high" identification/exploitation skills can include where the identification and exploitation of the security vulnerability of the product 342 involves a high level of manual effort (e.g., a quantity of processing resources and/or time investment to identify the security vulnerability and/or exploit that exceeds a predetermined threshold).

An "intermediate" identification/exploitation skills can include where the skills involved to identify and exploit the security vulnerability of the product 342 are relatively commonly known and available, but a modicum of manual effort is involved in identification of the security vulnerability and/or its exploitation (e.g., a quantity of processing resources and/or time investment to identify the security vulnerability and/or exploit that is between two predetermined thresholds).

A "high" identification/exploitation skills can include where the skills involved to identify and exploit the security vulnerability of the product 342 are very common (e.g., where identifying the security vulnerability and/or its exploitation can be accomplished utilizing publically available well-documented information and/or automatically by utilizing easy to use and/or free utilities). A "high" identification/exploitation skills can include where identification and exploit of the security vulnerability of the product 342 involves skills, knowledge, utilities and/or quantities of time below a predefined threshold.

Each description of the set of the descriptions can be scored by a score calculator. For example, the descriptions can be associated with a score that can be a number within a sequence of numbers comprising a scale. The scores can include, for example, the numbers 1, 2, and 3. For example, the description describing the skills as "high" (e.g., exploitation of the security vulnerability involves skills and knowledge that are uncommon, identification of the security vulnerability and/or its exploitation involves a high level of manual effort, etc.) can be associated with a score of 1. The description describing the skills as "intermediate" (e.g., the skills, knowledge, and/or utilities involved in the identification of the security vulnerability and/or its exploitation are commonly known and available, but a modicum of manual effort is involved in identification of the security vulnerability and/or its exploitation, a quantity of processing resources and/or time investment to identify the security vulnerability and/or exploit that is between two predetermined thresholds is involved in exploiting the security vulnerability, etc.) can be associated with a score of 2. The description describing the skills as "low" (e.g., e.g., exploitation can be accomplished utilizing publically available well-documented information, exploitation can be accomplished utilizing easy to use and/or free utilities, identifying the security vulnerability and/or its exploitation involves skills, knowledge, utilities and/or quantities of time below a predefined threshold, etc.) can be associated with a score of 3.

A selection of a scored description of the set of descriptions associated with the skills involved in identification of a security vulnerability and/or its exploitation can be received as an input and the score can be associated with the skills security risk element. That is, the skills security risk element can be scored according to the score associated with the selected description.

The security risk element can include an attack surface of a product 342 associated with exploitation of a security vulnerability of the product 342. As used herein, an attack surface of a product 342 includes the sum of different vulnerable surfaces (e.g., entry point, input fields, protocols, interfaces, services, etc.) of the product 342 where an unauthorized entity can exploit a security vulnerability. The question can therefore include a prompt to characterize a metric of the product 342 that is associated with the security risk element. For example, the question can include a prompt to characterize the attack surface of the product 342.

The characterization can include a description selected from a set of descriptions each providing a portion of coverage of a range, scale, and/or continuum of possible classifications and/or quantifications of the product 342 as it relates to the attack surface of the product 342.

The set of descriptions can include a description describing the attack surface of the product 342 as "low," "intermediate," and/or "high." A "high" attack surface can include where vulnerable surfaces of a product 342 are highly protected (e.g., only accessible upon identity verification, is protected access control measures, and/or includes a strict security protocol) and/or are a portion of an obscure functionality of the product 342. Additionally, a "high" attack surface can include where a quantified amount of protection of vulnerable surfaces of a product 342 exceeds a predetermined threshold of protection.

An "intermediate" attack surface can include where vulnerable surfaces of a product 342 include some protective measures such as the potential attack surfaces being accessible through a protected interface limiting users and/or access to the attack surface depending on licensing arrangements and configuration of the product 342. Additionally, an "intermediate" attack surface can include where a quantified amount of protection of vulnerable surfaces of a product 342 is between two predetermined thresholds of protection.

A "low" attack surface can include where vulnerable surfaces of a product 342 are public. A "low" attack surface can include where vulnerable surfaces of a product 342 are accessible through publically accessible surfaces of the product 342, through surfaces of the product 342 found in a portion of features of the product 342 exceeding a predetermined threshold, and/or through a surface of the product 342 that can be identified by a quantity of users exceeding a predetermined threshold.

Each description of the set of the descriptions can be scored by a score calculator. For example, the descriptions can be associated with a score that can be a number within a sequence of numbers comprising a scale. The scores can include, for example, the numbers 1, 2, and 3. For example, the description describing the attack surface as "high" (e.g., the attack surface is only accessible upon identity verification, the attack surface is protected access control measures, the attack surface includes a strict security protocol, the attack surface is a portion of an obscure functionality of the product 342, the attack surface includes a quantified amount of protection that exceeds a predetermined threshold of protection) can be associated with a score of 1. The description describing the attack surface as "intermediate" (e.g., the attack surface is accessible through a protected interface limiting users and/or access to the attack surface, access to the attack surface depends on licensing arrangements and configuration of the product 342, the attack surface includes a quantified amount of protection that is between two predetermined thresholds of protection, etc.) can be associated with a score of 2. The description describing the attack surface as "low" (e.g., the attack surface is accessible through publically accessible surfaces of the product 342, the attack surface is accessible through surfaces of the product 342 found in a portion of features of the product 342 exceeding a predetermined threshold, the attack surface is accessible through a surface of the product 342 that can be identified by a quantity of users exceeding a predetermined threshold, etc.) can be associated with a score of 3.

A selection of a scored description of the set of descriptions associated with the attack surface can be received as an input and the score can be associated with the attack surface security risk element. That is, the attack surface security risk element can be scored according to the score associated with the selected description.

The score associated with each of the descriptions associated with the confidentiality impact, the integrity impact, the availability impact, the attack skills, the access vector, the affected tenants, affected users, identification and exploitation skills, and/or attack surface security risk elements can be modifiable by a user device and/or an organization associated with the product 342 to reflect a maturing tolerance for risk.

Each segment (e.g., impact potential segment, reconstructing segment, attack vectors segment, coverage spread segment, identify and exploit segment, etc.) can be associated with a score. For example, the score calculator can calculate and/or assign a score for each segment based on the scored security risk elements associated with the respective segments.

The impact potential segment can be scored based on the confidentiality impact security risk element score, the integrity impact security risk element score, and the availability impact risk element score. The confidentiality impact security risk element score, the integrity impact security risk element score, and the availability impact risk element score can be analyzed and/or compared to calculate an impact potential segment score. For example, the confidentiality impact security risk element score, the integrity impact security risk element score, and the availability impact risk element score can be compared and the maximum score of the three scores can be designated the impact potential segment score. For example, if the confidentiality impact security risk element score is 2, the integrity impact security risk element score is 0, and the availability impact risk element score is 3, then 3 can be designated the impact potential segment score.

The reconstructing segment can be scored based on the reproducibility security risk element score. The reproducibility security risk element score can be analyzed to calculate a reconstructing segment score. For example, the reproducibility security risk element score, between 1-3, can be designated the reconstructing segment score.

The attack vectors segment can be scored based on the attack skills security risk element score and the access vectors security risk element score. The attack skills security risk element score and the access vectors security risk element score can be analyzed and/or compared to calculate an attack vectors segment score. For example, the arithmetic mean of the attack skills security risk element score and the access vectors security risk element score can be calculated and rounded up to the nearest integer, which can be designated as the attack vectors segment score. For example, if the attack skills security risk element score is 3 and the access vectors security risk element score is 2, an arithmetic mean of the scores, 2.5, can be rounded up to the nearest integer, in this example 3. Accordingly, the attack vectors segment score can be designated as 3.

The coverage spread segment can be scored based on the affected tenants security risk element score and the affected users security risk element score. The affected tenants security risk element score and the affected users security risk element score can be analyzed and/or compared to calculate an attack vectors segment score. For example, if the product 342 is a multi-tenancy software application (e.g., where a single instance of the software application runs on a server serving multiple client-organizations, etc.), then the affected tenants security risk element score and the affected users security risk element score can be compared and the maximum score of the two scores can be designated the coverage spread segment score. For example, if the affected tenants security risk element score is 1 and the affected users security risk element score is 2, then 2 can be designated the coverage spread segment score. If the product 342 is a non-multi-tenancy software application (e.g., multi-instance software product where separate software instances and/or hardware systems operate on behalf of different client-organizations, etc.), then the affected users security risk element score can be designated the coverage spread segment score.

The identify and exploit segment can be scored based on the identify and exploit skills security risk element score and the attack surface security risk element score. The skills security risk element score and the attack surface security risk element score can be analyzed and/or compared to calculate an identify and exploit segment score. For example, the arithmetic mean of the skills security risk element score and the attack surface security risk element score can be calculated and rounded up to the nearest integer, which can be designated as the identify and exploit segment score. For example, if the skills security risk element score is 3 and the attack surface security risk element score is 2, an arithmetic mean of the scores, 2.5, can be rounded up to the nearest integer, in this example 3. Accordingly, the identify and exploit segment score can be designated as 3.

As discussed earlier, the risk assessment framework can include a composite risk index including an impact component representing an impact of a risk event and a likelihood component including a probability of a risk event occurrence. The impact component and likelihood component can also be scored by the score calculator based on the aforementioned scored segments. For example, the impact component can be scored based on the impact potential segment score and the identify and exploit segment score. The impact component score can be a sum of a weighted impact potential segment score and a weighted identify and exploit segment score. For example, the impact component can be a sum of the impact potential segment score with a seventy percent weighting and the identify and exploit segment score with a thirty percent weighting.

Additionally, the likelihood component can be scored based on the reconstructing segment score, the attack vectors segment score, and the coverage spread segment score. For example, the likelihood component score can be an arithmetic mean of the reconstructing segment score, the attack vectors segment score, and the coverage spread segment score.

The score calculator can calculate a total risk score for the product 342. The total risk score for the product 342 can be based on the impact component score and/or the likelihood component score. For example, the total risk score can be based on the product of multiplying the impact component score and the likelihood component score. The total risk score can, for example, be the sum of the product of multiplying the impact component score by the likelihood component score and the number 1. In such examples, the total risk score is a number between 2 and 10.

A risk score characterizer can characterize a total risk score associated with the security vulnerabilities of the product 342 based on where the total risk score falls within a predetermined characterization scale. The predetermined characterization scale can include a characterization associated with a portion of possible total risk scores. The predetermined characterization scale can be modified by a user device. For example, the portions of a possible total risk scores corresponding to a particular characterization can be modified as the product 342 and/or associated entity's risk tolerance matures.

The predetermined characterization scale can include threshold total risk score values corresponding to a risk characterization. For example, a total risk score from 2 to 4.9 can correspond to a "low" risk characterization (e.g., where lower total risk scores correspond to lower total risk), a total risk score of 5 to 7 can correspond to a "medium" risk characterization, a total risk score of 7.1 to 8.5 can correspond to a "high" risk characterization, and a total risk score of 8.6 to 10 can correspond to a "critical" risk characterization. The characterization can also be modified by a user device to reflect the needs and tolerances of a user.

As described above, the security assessment can identify a quantity of total risk scores and a quantity of risk characterizations associated with a product 342. The security assessment can be repeated during different stages of development of the product 342 and/or to address different security vulnerabilities of the product 342. The vulnerability calculator 348 can calculate a vulnerability score for a product 342 based on an aggregation of a quantity of each risk characterizations for the product 342 generated during the security assessment. The vulnerability calculator 348 can calculate a vulnerability score for a product 342 by assigning a weight (e.g., modifiable by a business and/or user device) to each quantity of each risk characterizations for the product 342 and aggregating the quantity of the risk characterizations for the product 342. For example, the vulnerability calculator 348 can calculate a vulnerability score for a product 342 utilizing the following mathematical operation:

$$VS = \left(50 \times \left(\frac{CR \times 20^*}{100}\right)\right) + \left(30 \times \left(\frac{HR \times 10^*}{100}\right)\right) + \left(17.5 \times \left(\frac{MR \times 5^*}{100}\right)\right) + \left(2.5 \times \left(\frac{LR \times 2^*}{100}\right)\right)$$

where VS is the vulnerability score, where CR is the quantity of critical risk characterizations for the product 342, where the HR is the quantity of high risk characterizations for the product 342, where the MR is the quantity of medium risk characterizations for the product 342, where the LR is the quantity of low risk characterizations for the product 342, and where * denotes that the amount cannot exceed one. Utilizing the mathematical operation above, vulnerability calculator 348 can calculate a vulnerability score for a product 342 between one and one hundred.

The vulnerability score calculator 348 can compare the vulnerability score for the product 342 to a plurality of thresholds to determine a product vulnerability score characterization (e.g., level). A product vulnerability level includes a qualitative and/or quantitative description of a vulnerability score level of a plurality of vulnerability score levels that the vulnerability score of the product 342 falls within, wherein the levels are defined by threshold vulnerability scores. For example, a high vulnerability score level can include vulnerability scores for a product 342 that are greater than or equal to a vulnerability score of seventy. A medium vulnerability score level can include vulnerability scores for a product 342 that are greater than or equal to a vulnerability score of thirty and/or less than a vulnerability score of seventy. A low vulnerability score level can include vulnerability scores for a product 342 that are less than a vulnerability score of thirty. The thresholds to determine a vulnerability score level are modifiable by a business and/or a user device in order to adapt to changing tolerances and goals of the business.

The risk profile calculator 350 can calculate a risk profile for the product 342. As used herein, a risk profile can include a characterization of a security risk and an asset value impact associated with an exploitation of a security risk of the product 342 being analyzed. The risk profile calculator 350 can calculate a risk profile for the product 342 by multiplying the vulnerability score of the product 342 and the criticality score for the product 342. The risk profile calculator 350 can compare the risk profile for the product 342 to a plurality of thresholds to determine a risk profile characterization (e.g., level).

The risk profile manager 344 can include and/or have access to a database. The database can be used to store all inputs, selections, criticality scores, criticality score characterizations, vulnerability score, vulnerability score characterizations, risk profiles, risk profile characterizations, and or other data related to the product 342. Additionally, the database and any stored inputs, selections, criticality scores, criticality score characterizations, vulnerability score, vulnerability score characterizations, risk profiles, risk profile characterizations, and or other data related to the product 342 can be accessed. Any of the criticality calculator 346, the vulnerability calculator 348, and/or the risk profile calculator 350 can save to and/or access the database.

The risk profile calculator 350 can compare the product 342 to another product. For example, the risk profile calculator 350 can compare the product risk profile of a software product 342 being assessed with a product risk profile of another product. The product 342 being assessed can be compared to risk profile of a benchmark product. The comparison can include flagging the risk profile of the product 342 being assessed where it deviates from the risk profile of the benchmark product. The comparison can also include generating projections and/or recommended risk mitigation measures for the product 342 being assessed based on historical risk mitigation measures and or application qualities associated with the benchmark product. In another example, the inputs, selections, criticality scores, criticality score characterizations, vulnerability score, vulnerability score characterizations, risk profiles, risk profile characterizations, and or other data related to the product 342 being assessed can be compared to historical inputs, selections, criticality scores, criticality score characterizations, vulnerability score, vulnerability score characterizations, risk profiles, risk profile characterizations, and or other data related to another product that has been assessed and/or a different version of the same product 342 being assessed.

The risk profile calculator 350 can also generate displays associated with the inputs, selections, criticality scores, criticality score characterizations, vulnerability score, vulnerability score characterizations, risk profiles, risk profile characterizations, and or other data related to the product 342 being assessed. The displays can include graphical displays of trends (e.g., improvements, declines, etc.), scores, characterizations, profiles, and/or comparisons associated with the product 342 being assessed. For example, the risk profile calculator 350 can generate a heat map having a vulnerability score x-axis and a criticality characterization y-axis wherein each product 342 is presented on the grid in a position corresponding to its respective values. The generated displays can be transmitted and/or displayed to a user device and or the business associated with the product 342 being assessed.

Figure 4:
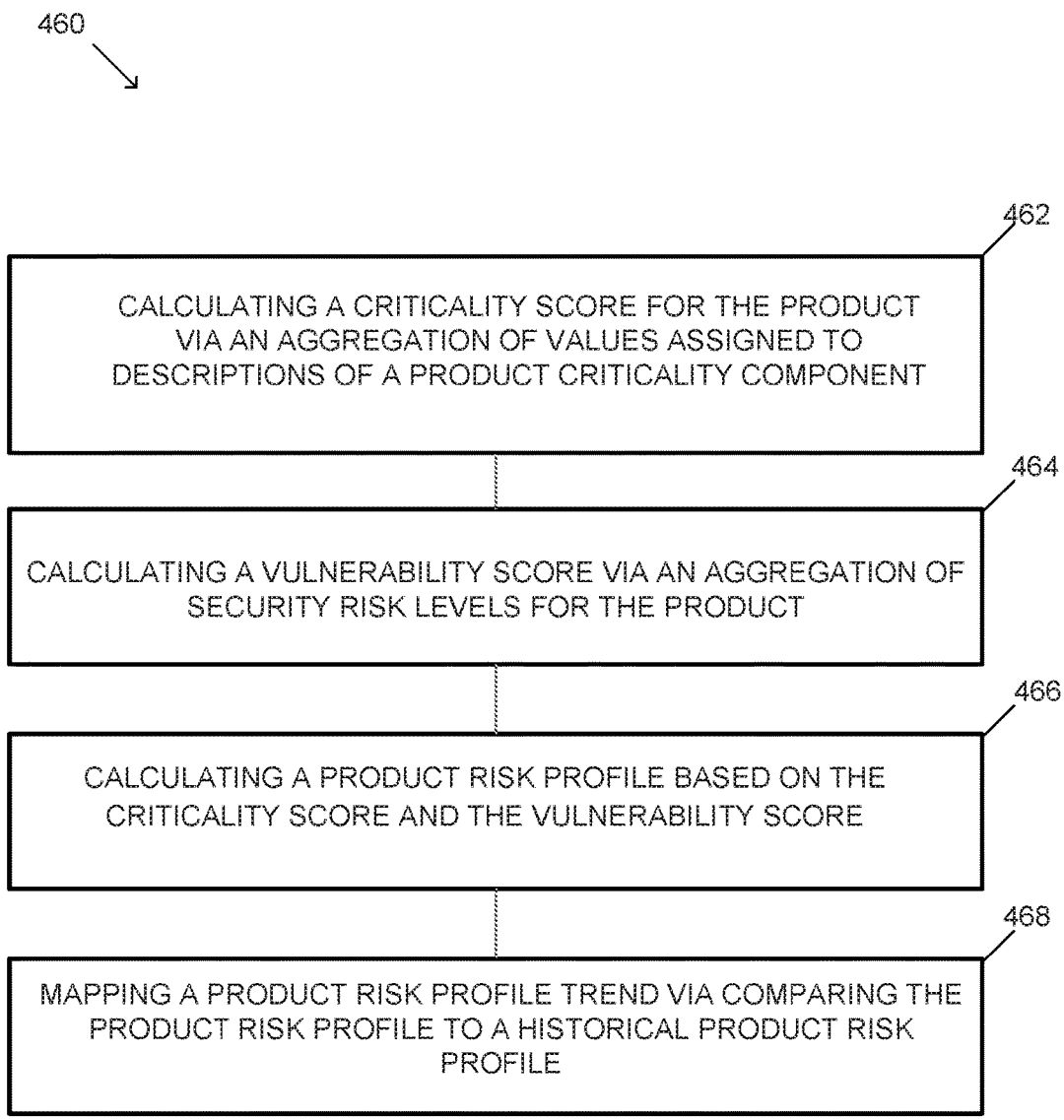
FIG. 4 is a flow chart of an example of a method for calculating a product risk profile according to the present disclosure.

FIG. 4 is a flow chart of an example of a method 460 for calculating a comprehensive risk profile of a product according to the present disclosure. In some embodiments, the method 460 can be performed utilizing a system (e.g., system 100 as referenced in FIG. 1) and/or a computing device (e.g., computing device 220 as referenced in FIG. 2).

At box 462 the method 460 can include calculating a criticality score for the product via a weighted aggregation of values assigned to a plurality of descriptions of a component of a product criticality for a product. The weight assigned to each of the values can be based on a modifiable weighting guideline. The modifiable weighting guideline can define values associated with each selected description from a provided modifiable description set based on the tolerances and preferences of a business associated with the product.

At box 464 the method 460 can include calculating a vulnerability score via an aggregation of an amount of each of a plurality of security risk characterizations (e.g., levels) for the product, wherein the amount of each of the plurality of security risk levels is weighted. For example, if a security assessment of a product returns four critical risk characterizations, five high risk characterizations, one medium risk characterizations, and one low risk characterization, then the vulnerability score can be based on a weighted aggregation of the four critical risk characterizations, five high risk characterizations, one medium risk characterizations, and one low risk characterization. In an example, the higher the risk characterizations (e.g., on a scale comprising critical risk to high risk to medium risk, to low risk, wherein critical is the highest risk and low is the lowest risk) can be weighted more heavily so as to have a greater influence on a final vulnerability score.

At box 466 the method 460 can include calculating a product risk profile based on the criticality score and the vulnerability score. For example, calculating a product risk profiles can include multiplying the criticality score and the vulnerability score to give a product risk profile score for the product being assessed.

At box 468 the method 460 can include mapping a product risk profile trend via comparing the product risk profile to a historical product risk profile. For example, mapping can include generating a display illustrating trends in the product risk profile of a product being assessed that were identified by comparing new product risk profile data for the product with historical product risk profile data of the same product taken over the course of the product lifecycle.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
   a processor; and
   a storage device comprising instructions executable by the processor to:
   calculate a criticality score via a weighted aggregation of numeric values assigned to a plurality of descriptions of a component of a product criticality of a software product, wherein the component of product criticality is a deployment model associated with the software product, and wherein the plurality of descriptions of the component comprise a description of an external deployment model, a description of a mixed deployment model, and a description of an internal deployment model;
   calculate a vulnerability score via an aggregation of a quantity of security risks, wherein the quantity of security risks includes a plurality of security risks detected during a security assessment for the software product; and
   after calculation of the criticality score and the vulnerability score, calculate a product risk profile for the software product via a multiplication of the criticality score and the vulnerability score.

2. The system of claim 1, to assign a criticality characterization to the software product based on a relationship of the criticality score to a predetermined threshold.

3. The system of claim 1, to assign a vulnerability characterization to the software product based on a relationship of the vulnerability score to a predetermined threshold.

4. The system of claim 1, wherein the criticality score of the software product correlates to a business value of the software product.

5. The system of claim 1, wherein the vulnerability score of the software product correlates to a probability of an exploitation of the software product and an impact of the exploitation.

6. The system of claim 1, wherein the instructions to calculate the vulnerability score comprise instructions to:
   divide the quantity of security risks into a plurality of subsets, the plurality of subsets comprising a first subset and a second subset, wherein the first subset includes security risks defined as having a high level of risk, and wherein the second subset includes security risks defined as having a low level of risk;
   multiply a count of the security risks in the first subset times a first weight factor to generate a first product;
   multiply a count of the security risks in the second subset times a second weight factor to generate a second product; and
   add the first product and the second product to generate the vulnerability score.

7. A non-transitory computer readable medium storing instructions executable by a processing resource to cause a computer to:
   calculate a criticality score via a weighted aggregation of numeric values assigned to a plurality of descriptions of at least one component of a product criticality of a software product undergoing development, wherein the at least one component of product criticality comprises a deployment model associated with the software product, and wherein the plurality of descriptions of the at least one component comprise a description of an external deployment model, a description of a mixed deployment model, and a description of an internal deployment model;
   calculate a vulnerability score via a weighted aggregation of a quantity of security risks, wherein the quantity of security risks includes a plurality of security risks detected during a security assessment of the software product;
   after calculation of the criticality score and the vulnerability score, calculate a product risk profile for the software product via a multiplication of the criticality score and the vulnerability score; and
   compare the product risk profile of the software product with a product risk profile of another software product.

8. The non-transitory computer readable medium of claim 7, wherein the product risk profile of another software product comprises a risk profile of a benchmark software product.

9. The non-transitory computer readable medium of claim 7, wherein at least one of the plurality of descriptions includes a description of a high annual revenue associated with the product.

10. The non-transitory computer readable medium of claim 7, wherein at least one of the plurality of descriptions includes a description of a business strategy associated with the product.

11. The non-transitory computer readable medium of claim 7, wherein at least one of the plurality of descriptions includes a description of a type of information associated with the product.

12. The non-transitory computer readable medium of claim 7, wherein at least one of the plurality of descriptions includes a description of a breach history associated with the product.

13. The non-transitory computer readable medium of claim 7, wherein the instructions to calculate the vulnerability score comprise instructions to:
divide the quantity of security risks into a plurality of subsets, the plurality of subsets comprising a first subset and a second subset, wherein the first subset includes security risks defined as having a high level of risk, and wherein the second subset includes security risks defined as having a low level of risk;
multiply a count of the security risks in the first subset times a first weight factor to generate a first product;
multiply a count of the security risks in the second subset times a second weight factor to generate a second product; and
add the first product and the second product to generate the vulnerability score.

14. A method, comprising:
calculating, by a processor, a criticality score for a software product via a weighted aggregation of numeric values assigned to a plurality of descriptions of at least one component of a product criticality for the software product, wherein the software product has not completed development wherein the at least one component of product criticality comprises a deployment model associated with the software product, and wherein the plurality of descriptions of the at least one component comprise a description of an external deployment model, a description of a mixed deployment model, and a description of an internal deployment model;
calculating, by the processor, a vulnerability score via an aggregation of an amount of each of a plurality of security risk levels for the software product, wherein the amount of each of the plurality of security risk levels is weighted, wherein each of the plurality of security risk levels is detected during a security assessment of the software product;
after calculating the criticality score and the vulnerability score, calculating, by the processor, a product risk profile based on the criticality score and the vulnerability score; and
mapping, by the processor, a product risk profile trend via comparing the product risk profile to a historical product risk profile.

15. The method of claim 14, wherein the weighted aggregation of numeric values assigned to the plurality of descriptions is based on a modifiable weighting guideline.

16. The method of claim 14, wherein each of the plurality of descriptions of components of the product criticality for the software product includes a selection of a modifiable provided set of descriptions.

17. The method of claim 14, further comprising:
allocating a plurality of development resources to the software product based on the mapped product risk profile trend.

18. The method of claim 14, wherein the plurality of descriptions comprise a description of a high annual revenue, a description of a medium annual revenue, and a description of a low annual revenue.

* * * * *